(12) United States Patent
Baard et al.

(10) Patent No.: US 9,134,832 B2
(45) Date of Patent: Sep. 15, 2015

(54) PORTABLE ELECTRONIC DEVICE AND METHOD OF CONTROLLING A PORTABLE ELECTRONIC DEVICE HAVING A PROXIMITY-SENSING USER INTERFACE

(75) Inventors: Henrik Baard, Lund (SE); Andreas Sandblad, Lund (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 123 days.

(21) Appl. No.: 13/810,302

(22) PCT Filed: Feb. 15, 2012

(86) PCT No.: PCT/EP2012/000670
§ 371 (c)(1),
(2), (4) Date: Jan. 15, 2013

(87) PCT Pub. No.: WO2013/113340
PCT Pub. Date: Aug. 8, 2013

(65) Prior Publication Data
US 2013/0201136 A1 Aug. 8, 2013

Related U.S. Application Data

(60) Provisional application No. 61/594,019, filed on Feb. 2, 2012.

(51) Int. Cl.
*G06F 3/041* (2006.01)
*G06F 3/044* (2006.01)

(52) U.S. Cl.
CPC ............... *G06F 3/041* (2013.01); *G06F 3/044* (2013.01); *G06F 3/0412* (2013.01); *G06F 2203/04101* (2013.01); *G06F 2203/04105* (2013.01)

(58) Field of Classification Search
CPC combination set(s) only.
See application file for complete search history.

(56) References Cited

U.S. PATENT DOCUMENTS

2004/0130442 A1* 7/2004 Breed et al. .................... 340/443
2009/0219175 A1* 9/2009 Takashima et al. ............. 341/20
(Continued)

FOREIGN PATENT DOCUMENTS

JP    2008 033701 A    2/2008
WO    02/35461 A1      5/2002

OTHER PUBLICATIONS

International Search Report, corresponding to PCT/EP2012/000670, mailed on Jun. 8, 2012.

(Continued)

*Primary Examiner* — Dwayne Bost
*Assistant Examiner* — Robert Michaud
(74) *Attorney, Agent, or Firm* — Renner, Otto, Boisselle & Sklar, LLP

(57) ABSTRACT

A portable electronic device comprises a proximity-sensing user interface and a controller. The proximity-sensing user interface is configured to capture position information and distance information. The controller is coupled to the proximity-sensing user interface and is configured to process first distance information (31) captured by the proximity-sensing user interface during a pre-determined touch action, to determine whether a material layer (25) is interposed between the user's skin and the proximity-sensing user interface. The controller is configured to selectively set an input mode from a first input mode to a second input mode when the first distance information indicates that no material layer (25) is interposed between the user's skin and the proximity-sensing user interface.

21 Claims, 5 Drawing Sheets

(56) References Cited

U.S. PATENT DOCUMENTS

2011/0141052 A1* 6/2011 Bernstein et al. ............. 345/174
2012/0071149 A1* 3/2012 Bandyopadhyay et al. .. 455/418
2012/0092296 A1* 4/2012 Yanase et al. ................ 345/174
2014/0340342 A1* 11/2014 Higashibeppu ............... 345/173

OTHER PUBLICATIONS

Written Opinion, corresponding to PCT/EP2012/000670, mailed on Jun. 8, 2012.

* cited by examiner

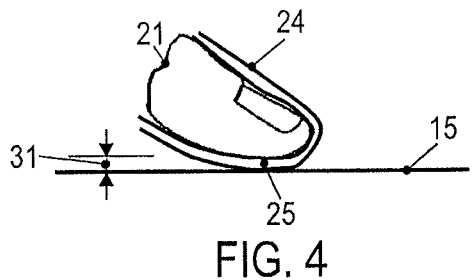
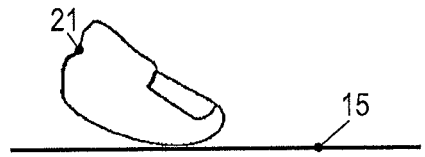
FIG. 4    FIG. 5
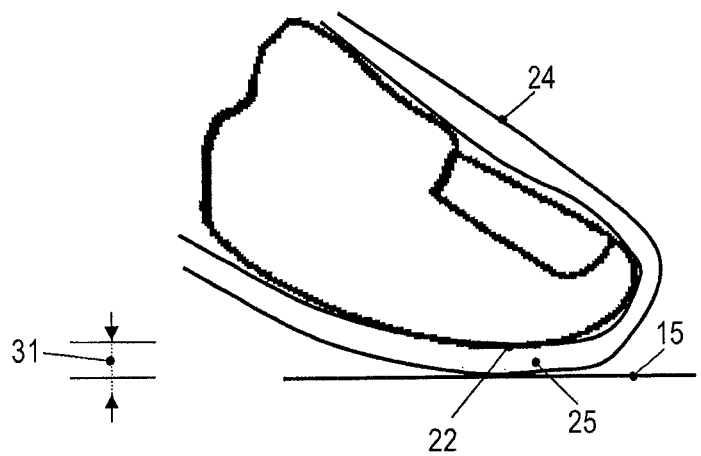
FIG. 6
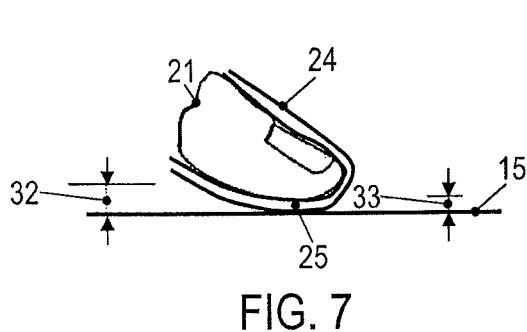
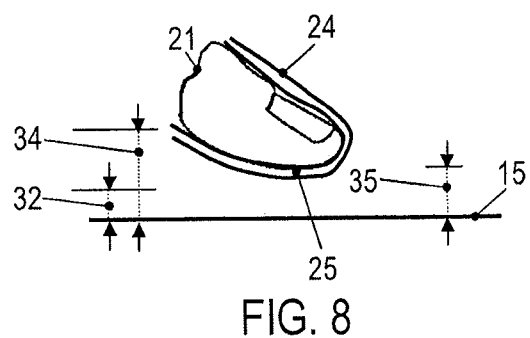
FIG. 7    FIG. 8
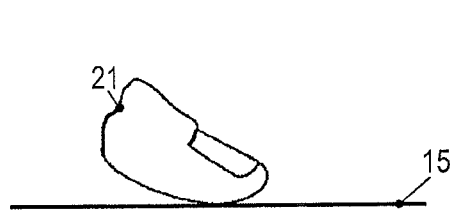
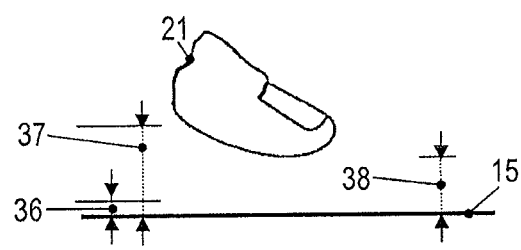
FIG. 9    FIG. 10

PORTABLE ELECTRONIC DEVICE AND METHOD OF CONTROLLING A PORTABLE ELECTRONIC DEVICE HAVING A PROXIMITY-SENSING USER INTERFACE

CROSS-REFERENCE TO RELATED APPLICATION

This application claims the benefit of U.S. Provisional Patent Application Ser. No. 61/594,019, filed Feb. 2, 2012, the entire disclosure of which is hereby incorporated by reference.

FIELD OF THE INVENTION

The invention relates to a portable electronic device and to a method of controlling a portable electronic device having a proximity-sensing user interface.

BACKGROUND

A wide variety of electronic devices may be equipped with user interfaces which are responsive to a touch action. Such user interfaces, which may be configured as transparent sensor panels which extend across a display, provide enhanced control and user interaction. Various implementations of user interfaces which are responsive to a touch action are available, including resistive sensor panels or capacitive sensor panels. Interfaces which are not only responsive to a direct touch, but which are also operative to sense proximity of an object provide additional versatility in the control of electronic devices. For illustration, a user may control different functions depending on whether the user's skin directly contacts the user interface or hovers above the user interface at a distance.

Touch sensor panels can be used in portable electronic devices, such as cellular phones, personal digital assistants, portable computers, or similar devices. Such portable electronic devices may be operated by a user wearing a glove, e.g. when used outdoor in cold weather conditions. Conventionally, a user may find a touch-sensitive user interface to be less responsive when operated through a glove, made from fabric, leather or other material which is not electrically conductive, when compared to the responsiveness attained when the skin directly contacts the user interface. In some cases, it may not be possible to operate the touch-sensitive user interface at all when the user wears a glove. Similar difficulties may exist when the portable electronic device is covered by a removable protective cover, or when the user does not wish to directly contact the user interface for other reasons. One approach to further enhance responsiveness of the user interface is to combine plural different interface technologies, e.g. by using both a resistive and a capacitive touch panel.

Such an approach may increase the amount of hardware required, and may add to the complexity and costs of the device. Manual adjustments of the responsiveness may reduce the comfort offered to the user.

SUMMARY OF THE INVENTION

Accordingly, there is a continued need in the art for a portable electronic device and for a method which address some of the above shortcomings. In particular, there is a continued need in the art for a portable electronic device and for a method in which good responsiveness of a user interface to touch actions can be attained even when the user wears a glove or when the user cannot touch the user interface for other reasons.

According to an embodiment, a portable electronic device is provided. The portable electronic device comprises a proximity-sensing user interface and a controller coupled to the proximity-sensing user interface. The proximity-sensing user interface is configured to capture position information and distance information, the distance information being indicative of a distance at which a user's skin is positioned from a surface of the proximity-sensing user interface. The controller is configured to process first distance information captured by the proximity-sensing user interface during a pre-determined touch action, to determine whether a material layer is interposed between the user's skin and the proximity-sensing user interface in the pre-determined touch action. The controller is configured to selectively set an input mode from a first input mode to a second input mode when the first distance information indicates that no material layer is interposed between the user's skin and the proximity-sensing user interface in the pre-determined touch action.

The portable electronic device allows the input mode to be adjusted based on whether the user wears a glove, or does not directly contact the proximity-sensing user interface for other reasons, e.g. because a removable protective cover is placed around the portable electronic device. The material layer may be automatically detected by analyzing the first distance information captured while a pre-determined action is performed, which is known to be a touch action.

The material layer may be a glove material or a layer of a protective cover.

The controller may be configured to accept, while the first input mode is active, an input action as a touch action even when the user's skin does not directly contact the user interface. The controller may be configured to accept, while the second input mode is active, the input action as a touch action only when the user's skin directly contacts the user interface.

The controller may be configured to identify, while the first input mode is active, an input action in which the user's skin remains spaced from the proximity-sensing user interface as a touch action when second distance information captured during the input action fulfills first criteria. The controller may be configured to calibrate the first criteria based on the first distance information.

The first criteria may comprise a comparison to a threshold. The controller may be configured to set the threshold based on the first distance information.

The controller may be configured to set the threshold based on a minimum distance between the user's skin and the surface of the proximity-sensing user interface during the pre-determined touch action.

The controller may be configured to set the threshold based on an averaged distance between the user's skin and the surface of the proximity-sensing user interface during the pre-determined touch action. The averaged distance may be determined taking into account variations in responsiveness of the proximity-sensing user interface as a function of position on the proximity-sensing user interface.

The controller may be configured to set the threshold based on the first distance information and based on first position information captured by the proximity-sensing user interface during the pre-determined touch action.

The controller may be configured to perform the comparison to the threshold as a function of second position information captured by the proximity-sensing user interface during the input action. The comparison may be performed taking into account variations in responsiveness of the proximity-sensing user interface, as a function of associated position information.

The controller may be configured to adjust the threshold based on the second distance information. The threshold may be adjusted selectively if the second distance information indicates that the user's skin did not directly touch the user interface, but approached it more closely than in the pre-determined touch action. The threshold may be adjusted selectively if the second distance information indicates that the user's skin did not directly touch the user interface, but approached it more closely than in the pre-determined touch action and preceding input actions.

The controller may be configured to selectively set the input mode from the first input mode to the second input mode when the second distance information indicates that the user's skin is in direct contact with the surface of the proximity-sensing user interface.

The controller may be configured to maintain the input mode set to the second input mode until the portable electronic device enters an idle state in which it has reduced functionality. Alternatively or additionally, controller may be configured to maintain the input mode set to the second input mode until a timeout condition occurs.

The controller may be configured to identify, while the second input mode is active, the input action as a touch action when the second distance information captured during the input action fulfills second criteria, the second criteria being different from the first criteria. The second criteria may require the user's skin to directly touch the surface of the user interface.

The controller may be configured to bring the portable electronic device to an active state in response to the pre-determined touch action. The pre-determined touch action may be a wake-up action to wake up the portable electronic device from an idle state. The pre-determined touch action may be a call-accept action to accept an incoming call. The pre-determined touch action may be a screen unlocking action. The pre-determined touch action may be a key press action. The pre-determined touch action may be a dedicated touch action in a calibration procedure.

The proximity-sensing user interface may comprise a capacitive touch sensor panel overlaid on a display panel.

The proximity-sensing user interface may comprise a force sensor configured to capture a force applied onto the capacitive touch sensor panel. The controller may be coupled to the force sensor and may be configured to control operation of the portable electronic device based on the captured force. The controller may be configured to verify, based on the captured force, whether a force was exerted onto the capacitive touch sensor panel in the pre-determined touch action. The controller may be configured to verify, while the input mode is set to the first input mode, whether a force was exerted onto the capacitive touch sensor panel in the input action. The input action may be identified as a touch action conditionally dependent on whether a force was exerted onto the capacitive touch sensor panel.

According to another embodiment, a method of controlling a portable electronic device is provided. The portable electronic device has a proximity-sensing user interface. The method comprises capturing, by the proximity-sensing user interface, first distance information indicative of a distance at which a user's skin is positioned from a surface of the proximity-sensing user interface during a pre-determined touch action. The method comprises processing the first distance information to determine whether a material layer is interposed between the user's skin and the proximity-sensing user interface in the pre-determined touch action. The method comprises selectively setting an input mode from a first input mode to a second input mode when the first distance information indicates that no material layer is interposed between the user's skin and the proximity-sensing user interface in the pre-determined touch action.

When the first input mode is active, an input action may be accepted as a touch action even when the user's skin does not directly contact the user interface. When the second input mode is active, the input action may be accepted as a touch action only when the user's skin directly contacts the user interface.

When the first input mode is active, an input action in which the user's skin remains spaced from the proximity-sensing user interface may be accepted as a touch action when second distance information captured during the input action fulfills first criteria. The first criteria may be calibrated based on the first distance information.

The first criteria may comprise a comparison to a threshold. The threshold may be set based on the first distance information.

The threshold may be set based on a minimum distance between the user's skin and the surface of the proximity-sensing user interface during the pre-determined touch action.

The threshold may be set based on an averaged distance between the user's skin and the surface of the proximity-sensing user interface during the pre-determined touch action. The averaged distance may be determined taking into account variations in responsiveness of the proximity-sensing user interface, as a function of position on the proximity-sensing user interface.

The threshold may be set based on the first distance information and based on first position information captured by the proximity-sensing user interface during the pre-determined touch action.

The comparison to the threshold may be performed as a function of second position information captured by the proximity-sensing user interface during the input action. The comparison may be performed taking into account variations in responsiveness of the proximity-sensing user interface, as a function of second position information.

The threshold may be adjusted based on the second distance information. The threshold may be adjusted selectively if the second distance information indicates that the user's skin did not directly touch the user interface, but approached it more closely than in the pre-determined touch action. The threshold may be adjusted selectively if the second distance information indicates that the user's skin did not directly touch the user interface, but approached it more closely than in the pre-determined touch action and preceding input actions.

The input mode may be selectively set from the first input mode to the second input mode when the second distance information indicates that the user's skin is in direct contact with the surface of the proximity-sensing user interface.

Once the input mode is set to the second input mode, the input mode may remain set to the second input mode until the portable electronic device enters an idle state in which it has reduced functionality. Alternatively or additionally, the input mode may remain set to the second input mode until a timeout condition occurs.

While the second input mode is active, the input action may be identified to be a touch action when the second distance information captured during the input action fulfills second criteria, the second criteria being different from the first criteria. The second criteria may require the user's skin to directly touch the surface of the user interface.

The portable electronic device may be brought into an active state in response to the pre-determined touch action. The pre-determined touch action may be a wake-up action to wake up the portable electronic device from an idle state. The pre-determined touch action may be a call-accept action to accept an incoming call. The pre-determined touch action may be a screen unlocking action. The pre-determined touch action may be a key press action. The pre-determined touch action may be a dedicated touch action in a calibration procedure.

The proximity-sensing user interface may comprise a capacitive touch sensor panel overlaid on a display panel.

The proximity-sensing user interface may comprise a force sensor configured to capture a force applied onto the capacitive touch sensor panel. Operation of the portable electronic device may be controlled based on the captured force. The method may comprise verifying, based on the captured force, whether a force was exerted onto the capacitive touch sensor panel in the pre-determined touch action. While the input mode is set to the first input mode, it may be verified whether a force was exerted onto the capacitive touch sensor panel in the input action. The input action may be identified as a touch action conditionally dependent on whether a force was exerted onto the capacitive touch sensor panel.

According to yet another embodiment, there is provided a non-transitory storage medium storing instruction code which, when executed by a controller of a portable electronic device, directs the portable electronic device to perform the method of any one aspect or embodiment.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and advantages of the invention will become apparent from the following detailed description when read in conjunction with the accompanying drawings, in which like reference numerals refer to like elements.

FIG. 4 is a view illustrating processing of a pre-determined touch action performed by the portable electronic device of an embodiment when the user wears a glove.

FIG. 5 is a view illustrating processing of a pre-determined touch action performed by the portable electronic device of an embodiment when the user does not wear a glove.

FIG. 6 is a detail view of a finger tip approaching a surface of a proximity-sensing user interface when the user wears a glove.

FIG. 7 and FIG. 8 illustrate processing of an input action performed by the portable electronic device of an embodiment when a first input mode is active.

FIG. 9 and FIG. 10 illustrate processing of an input action performed by the portable electronic device of an embodiment when a second input mode has been activated.

DETAILED DESCRIPTION OF EMBODIMENTS OF THE INVENTION

Figure 1:
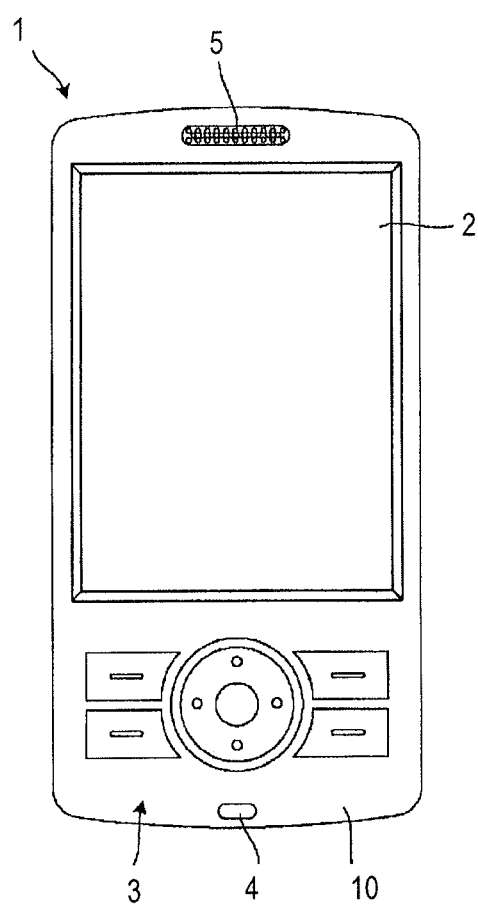
FIG. 1 is a plan view of a portable electronic device of an embodiment.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or other physical or functional units shown in the drawings or described herein may also be implemented by an indirect connection or coupling. Functional blocks may be implemented in hardware, firmware, software or a combination thereof.

The features of the various embodiments may be combined with each other, unless specifically noted otherwise.

Figure 2:
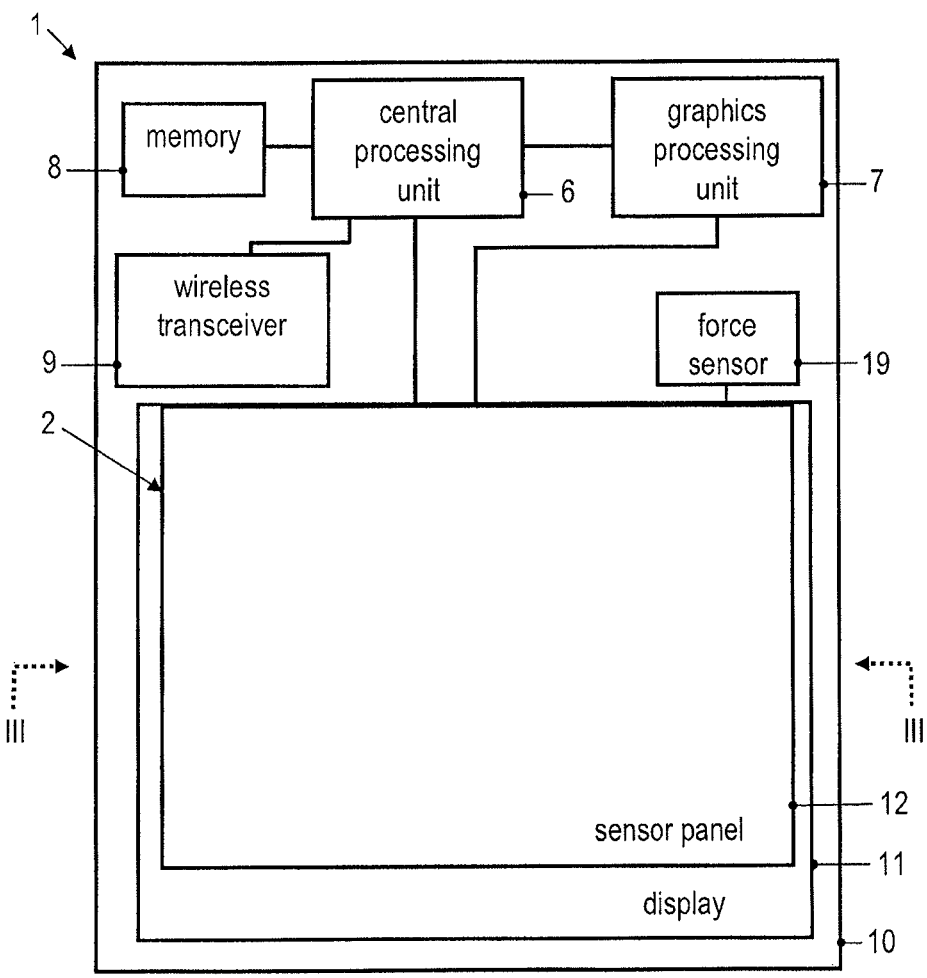
FIG. 2 is a block diagram representation of the portable electronic device of an embodiment.

FIG. 1 is a front view of a portable electronic device 1 of an embodiment. FIG. 2 is a schematic block diagram representation of the portable electronic device 1. The portable electronic device 1 includes a proximity-sensing user interface 2. The proximity-sensing user interface 2 includes a sensor panel 12 which may be overlaid on a display 11. The portable electronic device 1 may include additional input interface components. For illustration, navigation and control keys 3 configured as hard keys may be provided on a housing 10 of the portable electronic device.

The portable electronic device 1 has a controller. The controller may include one or plural processors. In the illustrated implementation, the controller includes a central processing unit 6 and a graphics processing unit 7. The portable electronic device 1 may further comprise a memory 8 storing instruction code for the central processing unit 6. A wireless transceiver 9 may be coupled to the central processing unit 7. The wireless transceiver 9 may be configured for wireless communication under a wireless communication standard, such as GSM, 3GPP, UMTS, LTE, WLAN, or other communication standards. The central processing unit 6 may control the wireless transceiver 9 so as to enable wireless voice and/or data communication. The central processing unit 6 may be coupled to a microphone 4 and a loudspeaker 5 for voice communication.

The portable electronic device 1 is configured such that the controller controls operation of the portable electronic device 1 in response to user input detected by the proximity-sensing user interface 2. As will be described in more detail, the controller evaluates distance information captured by the proximity-sensing user interface 2 in a pre-determined touch action to determine whether a material layer is interposed between the user's skin and the proximity-sensing user interface 2, e.g. because the user wears a glove or because a removable protective cover is positioned on the proximity-sensing user interface 2. An input mode is automatically set based on whether the material layer is detected. If it is determined that the user wears a glove, input actions are accepted as touch actions even when the user's skin does not directly contact a surface of the proximity-sensing user interface 2.

The proximity-sensing user interface 2 may include the sensor panel 12, which may be a capacitive touch sensor panel. The proximity-sensing user interface 2 may include a force sensor 19 which senses a force applied onto the sensor panel 12, or other additional sensor componentry. The proximity-sensing user interface 2 is configured to capture position information indicative of a position on the sensor panel 12 at which an input action occurs. Additionally, the proximity-sensing user interface is configured to capture distance information indicative of a distance between the user's skin and a surface of the sensor panel 12. Proximity-sensitive position sensing may be attained using a capacitive touch sensor panel, for example.

Figure 3:
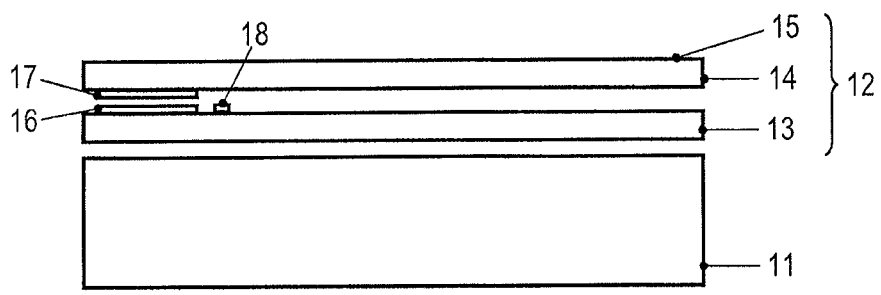
FIG. 3 is a cross-sectional view along lines in FIG. 2.

FIG. 3 is a cross-sectional view taken along lines III-Ill in FIG. 2 when the sensor panel 12 is configured as a capacitive touch sensor panel. The capacitive touch sensor panel may include a first layer 13 and a second layer 14 spaced from the first layer 13. Conductive patches 16, 17 may be provided on the first layer 13 and second layer 14. A resilient dielectric material may be interposed between the conductive patches 16 and 17. Conductive traces 18 may be connected to the conductive patches 16, 17, to allow capacitance sensing to be performed. Other configurations of capacitive touch sensor panels may also be used.

A capacitive touch sensor panel 12 is configured to be responsive to a touch action in which the user's skin directly contacts a surface 15 of the capacitive touch sensor panel 12. Additionally, the capacitive touch sensor panel 12 is also responsive to actions in which the user's skin approaches the surface 15 without directly contacting it. The distance from the surface 15 may be sensed, e.g. by sensing the changes in charge accumulated on capacitances, which are caused by the change in dielectric environment when the user's skin approaches the surface 15.

In the portable electronic device 1 of an embodiment, the proximity-sensing user interface 2 provides position information indicative of a position on the user interface 2 contacted by the user's skin or above which the user's finger is hovering. Additionally, the proximity-sensing user interface 2 provides distance information indicative of a distance at which the user's skin is positioned from the surface 15 of the proximity-sensing user interface 2. The distance information may have any one of a variety of formats. For illustration, the distance information may be an analogue signal or digital data which directly represent a distance value. The distance information may also be an analogue signal or digital data which allow the distance of the user's skin from the surface of the proximity-sensing user interface 2 to be derived. For illustration, the distance information may have the form of a capacitance change measured by a capacitive touch sensor panel, which allows the distance of the user's skin from the surface of the proximity-sensing user interface 2 to be derived.

In the portable electronic device 1 of embodiments, plural input modes are available. A first input mode is activated when a user wears a glove, for example. In the first input mode, an input action may be accepted as a touch action without requiring the user's skin to directly contact the surface 15 of the proximity-sensing user interface 2. While the first input mode is active, the input action may be identified as a touch action when distance information associated with the input action fulfills first criteria.

A second input mode may be selectively activated when it is determined that the user does not wear a glove, and the user's skin directly contacts the surface of the proximity-sensing user interface. In the second input mode, an input action may be identified as a touch action when distance information associated with the input action fulfills second criteria which are different from the first criteria. For illustration, in the second input mode, an input action may be identified as a touch action only if the user's skin directly contacts the surface 15 of the proximity-sensing user interface 2. Other second criteria different from the first criteria may be used to identify touch actions in the second input mode, i.e. when the user does not wear a glove and no other material is interposed between the user's finger and the proximity-sensing user interface.

While the operation of a portable electronic device and methods of embodiments will be described with reference to an exemplary scenario in which the user wears a glove, the embodiments are not limited thereto. For illustration, it will be appreciated that the devices and methods of embodiments are also operative to allow a user to operate the portable electronic device when the proximity-sensing user interface is covered by a removable protective cover. Similarly, the devices and methods of embodiments are operative to allow a user to operate the portable electronic device even when the user does not wish to directly touch the surface of the proximity-sensing user interface, such as in cases where the user's skin may be covered with dirt. In the latter case, a first input mode may remain activated and may be calibrated based on the distance at which the user's skin is positioned from the surface of the proximity-sensing user interface in an action which would normally be a touch action.

Both in the first input mode, e.g. the glove-mode, and in the second input mode, e.g. the non-glove mode, touch actions and hover actions may be used by the user to control the portable electronic device 1. The controller of the portable electronic device 1 may perform different functions depending on whether an input action at a given position is identified to be a touch action or a hover action. Different criteria are used in the first input mode and in the second mode to identify touch actions. In the first input mode, an input action is identified as a touch action even when only the glove material is in contact with the surface of the proximity-sensing user interface 2, while the user's skin remains spaced from the surface 15 of the proximity-sensing user interface 2. In the second input mode, an input action performed at the same lateral position and in which the user's skin remains spaced from the surface of the proximity-sensing user interface 2 may be identified as a hover action instead. Thereby, account may be taken of the fact that the glove material prevents the user's skin from directly contacting the surface 15 of the proximity-sensing user interface 2 when the user wears a glove.

In the portable electronic device 1 of embodiments, the input mode may be automatically set based on distance information captured in a pre-determined user action which is known to be a touch action, in which either the user's skin or a glove covering the user's skin directly contacts the surface 15 of the proximity-sensing user interface 2. For illustration, first distance information may be captured when a user performs a swipe movement or localized push action to bring the portable electronic device 1 to an active state, e.g. to wake-up from an idle state, to unlock the display screen, or to accept a received call. The first input mode, i.e. glove mode, may be set as a default mode. The input mode may be automatically changed to the second input mode, i.e. non-glove mode, when the first distance information indicates that the user's skin directly contacts the surface 15 of the proximity-sensing user interface 2. Alternatively or additionally, the first distance information captured during the pre-determined user action may be used to calibrate the first criteria used for identifying touch actions when the first input mode is active. This allows the first input mode to be automatically calibrated. Gloves of different thickness and material may be automatically accounted for when performing such an automatic calibration.

The operation of the portable electronic device 1 will be explained in more detail with reference to FIGS. 4-14.

FIGS. 4 and 5 illustrate the user's finger 21 in a pre-determined touch action, in which either the user's skin or glove material covering the user's skin directly contacts the surface 15 of the proximity-sensing user interface 2. The pre-determined touch action may be an action to wake up the portable electronic device from an idle state to a fully operational state, an action to accept an incoming call, or an action to unlock the screen. The pre-determined touch action may be a swipe movement along a portion of the screen. First distance information is captured by the proximity-sensing user interface 2 during the pre-determined touch action.

As seen in FIG. 4, when the user's finger 21 is covered by a glove 24, a layer of glove material 25 remains interposed between the user's skin and the surface 15 of the proximity-sensing user interface 2. Accordingly, the sensed distance information indicates that the user's skin is spaced from the surface 15 of the proximity-sensing user interface 2 by a distance 31. As illustrated in the enlarged view of FIG. 6, the distance 31 may be defined to be the distance between the surface 15 and the point on the user's skin 22 which most closely approaches the surface 15 of the proximity-sensing user interface 2. The finite distance 31 sensed in the pre-determined touch action may be used by the controller of the portable electronic device. In response to sensing the finite distance 31, the first input mode for operation with gloves may remain activated. In the first input mode, the user's skin is not required to directly touch the surface 15 of the proximity-sensing user interface 2 in a touch action. Additionally, the controller may calibrate first criteria employed to identify touch actions in the first input mode based on the sensed finite distance 31.

As seen in FIG. 5, when the user's finger 21 is not covered by a glove, the user's skin directly contacts the surface 15 of the proximity-sensing user interface 2. Accordingly, the sensed distance information indicates that the user's skin is in direct contact with the surface 15 of the proximity-sensing user interface 2. This causes the controller of the portable electronic device 1 to set the input mode from the first input mode, i.e. glove mode, to the second input mode, i.e. the non-glove mode.

FIGS. 7 and 8 illustrate processing of input actions while the input mode is set to the first input mode, i.e. glove mode.

FIG. 7 illustrates an input action identified to be a touch action when the user wears a glove 24. When the user wears a glove 24, the layer of glove material 25 prevents the user's skin from directly contacting the surface 15 of the proximity-sensing user interface 2 in an input action. Second distance information on a distance 33 between the user's skin and the surface 15 of the proximity-sensing user interface 2 may be captured by the proximity-sensing user interface 2 and processed by the controller of the portable electronic device 1. The input action may be identified as a touch action based on whether the sensed distance 33 fulfills first criteria. For illustration, the input action may be identified as a touch action based on whether the sensed distance 33 is smaller than a threshold 32. The threshold 32 may be set based on a distance 31 sensed in the pre-determined touch action. Alternatively or additionally, the threshold 32 may be set based on distances sensed in an earlier input action which was identified to be a touch action while the input mode was set to the first input mode, i.e. glove mode. This allows the threshold 32 to be adjusted based on the ongoing operation with the user wearing the gloves, until the portable electronic device 1 enters idle mode again. When the portable electronic device 1 enters idle mode, a new threshold 32 may be set as soon as the pre-determined touch action is received again to wake up the portable electronic device.

The first input mode may optionally also allow the user to control the portable electronic device using hover actions. FIG. 8 illustrates an input action identified to be a hover action when the user wears a glove 24. Second distance information on a distance 35 between the user's skin and the surface 15 of the proximity-sensing user interface 2 may be captured by the proximity-sensing user interface 2 and processed by the controller of the portable electronic device 1. The input action may be identified as a hover action based on whether the sensed distance 35 fulfills hover action criteria associated with the first input mode. For illustration, the input action may be identified to be a hover action when the distance 35 is greater than a lower threshold 32 and less than an upper threshold 34. The lower threshold 32 used in identifying hover actions may be the same as the threshold used in identifying touch actions in the first input mode, or may be different therefrom.

FIGS. 9 and 10 illustrate processing of input actions while the input mode is set to the second input mode, i.e. non-glove mode.

FIG. 9 illustrates an input action identified to be a touch action when the user does not wear a glove. The user's skin may directly contact the surface 15 of the proximity-sensing user interface 2 in an input action. The input action may be identified as a touch action based on whether the user's skin directly contacts the surface 15. Information on a sensed distance may be used to determine whether the user's skin directly contacts the surface 15.

The second input mode may optionally also allow the user to control the portable electronic device using hover actions. FIG. 10 illustrates an input action identified to be a hover action when the user does not wear a glove. Second distance information on a distance 38 between the user's skin and the surface 15 of the proximity-sensing user interface 2 may be captured by the proximity-sensing user interface 2 and processed by the controller of the portable electronic device 1. The input action may be identified as a hover action based on whether the sensed distance 38 fulfills hover action criteria associated with the second input mode. For illustration, the input action may be identified to be a hover action when the distance 38 is greater than a lower threshold 36 and less than an upper threshold 37. The lower threshold 36 used in identifying hover actions in the second input mode may be less than the lower threshold 32 used in identifying hover actions in the first input mode.

In operation of the portable electronic device 1, the controller may be configured such that it adjusts the first input mode when input actions are received while the first input mode is active. For illustration, the threshold 32 to which the distance 33 is compared to identify a touch action in the first input mode may be adjusted when an input action is identified as a touch action in the first input mode. Thereby, the first input mode may be configured as a learning input mode. Various techniques may be used to implement such a learning first input mode.

In an implementation, the threshold 32 is set based on the minimum distance between the user's skin and the surface 15 which is detected in the pre-determined touch action (illustrated in FIG. 4) or any one of the subsequent input actions identified to be touch actions while the first input mode is active. The threshold 32 may be set to a new value when the distance 33 sensed in an input action is smaller than any one of the previous minimum distances sensed while the first input mode is active. The threshold 32 may be re-set to a greater value at least when the portable electronic device enters idle mode again. By adjusting the threshold 32 in accordance with the minimum distance sensed in a touch through the glove during ongoing use in the first input mode, the risk of incorrectly identifying hover actions as touch actions may be reduced.

In another implementation, the threshold 32 may be set based on a floating average of the distances between the user's skin and the surface 15 detected in successive input actions while the first input mode remains active.

In operation of the portable electronic device 1, the controller may be configured such that the input mode is automatically set to the second input mode when the user's skin is detected to be in direct contact with the surface 15 of the proximity-sensing user interface 2. To detect direct contact between the user's skin and the surface 15, the distance information may be evaluated. For illustration, the first criteria used to detect a touch action in the first input mode may not only involve a comparison to an upper threshold 32, but may additionally also involve a comparison to a lower threshold (not illustrated in FIG. 7). The input mode may be set to the second input mode when a distance is sensed which is less than the lower threshold. The controller may also be configured such that the input mode may be set to the second input mode, i.e. non-glove mode, by a dedicated user action.

In operation of the portable electronic device 1, the controller may continue to maintain the input mode set to the second input mode once the second input mode has been activated, until the portable electronic device 1 enters idle mode again. This further enhances reliability when the user does no longer wear a glove.

In operation of the portable electronic device 1, the controller may evaluate additional sensor data to discriminate hover actions from touch actions in the first input mode. For illustration, an output signal of the force sensor 19 may be taken into account to verify that a force has been exerted onto the proximity-sensing user interface 2. An input action may be identified as a touch action based on the distance information captured by the proximity-sensing user interface 2 and based on the sensed force. Input actions may be discarded as touch actions if no force is sensed, even when the distance information indicates that the user's skin is spaced from the surface 15 by less than the threshold 32.

More complex processing may be performed to adjust identify touch actions in the first input mode, as will be explained with reference to FIGS. 11-14.

Figure 11:
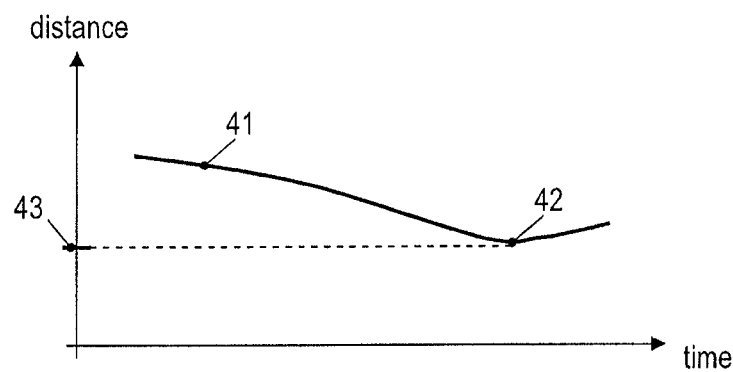
FIG. 11 illustrates first distance information processed by the portable electronic device of an embodiment.

FIG. 11 is a diagram illustrating distance information 41 indicative of the distance of the user's skin from the surface 15 of the proximity-sensing user interface 2 as a function of time. The user may perform a swipe movement across a section of the surface 15, for example, in order to wake up the portable electronic device 1 from an idle state. The distance between the user's skin and the surface 15 may vary in this swipe movement. The controller may determine a minimum 42 of the distance recorded in the swipe movement which brings the portable electronic device 1 into an active state. The distance 43 at the minimum 42 may be used to set the threshold 32 to which distance information is compared in the first input mode.

The threshold 32 may be determined based on the sensed minimum distance 43. For illustration, the threshold 32 may be computed by multiplying the minimum distance 43 by a number which is greater than one, in particular equal to or greater than two, in particular equal to or greater than three.

When setting the threshold 32 used for identifying touch actions in the first input mode, the lateral position at which the user's finger was hovering above the surface 15 of the proximity-sensing user interface 2 may be taken into account. A spatially varying weighting function may be used to take into account that the proximity-sensing user interface 2 may have a non-uniform response. For illustration, capacitance changes may be less pronounced when the user wearing a glove touches a region close to the outer boundaries of the proximity-sensing user interface 2, as compared to the response attained when touching a central area of the proximity-sensing user interface 2. For further illustration, the rigidity of the housing 10 may prevent the user's skin covered by glove material from approaching the surface 15 of the proximity-sensing user interface 2 to very close distances at positions located close to the outer boundaries of the proximity-sensing user interface 2, as compared to the response attained when touching a central area of the proximity-sensing user interface 2. Such variations in the responsiveness of the proximity-sensing user interface 2 may be taken into account both when calibrating the first input mode based on captured distance information and when subsequently determining, based on distance information captured during an input action, whether the input action qualifies as a touch action.

Figure 12:
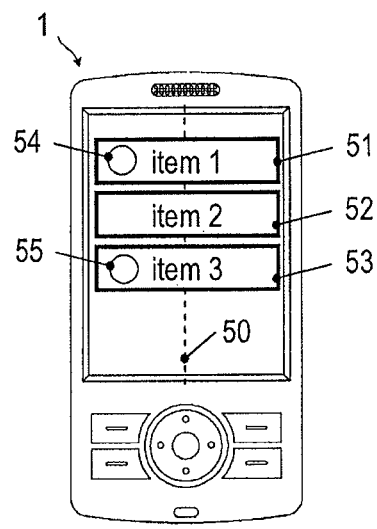
FIG. 12 is a view illustrating operation of the portable electronic device of an embodiment.

FIG. 12 illustrates operation of the portable electronic device 1. The controller may perform different actions in response to receiving a hover action and in response to receiving a touch action, both in the first input mode and in the second input mode. For illustration rather than limitation, hover actions may be used to scroll through items, to pre-select items, to browse through plural pages of information, or to perform other scrolling or browsing actions. Touch actions may be used to confirm selections, to activate pre-selected functions, to input information, to place a call, to accept an incoming call, or to perform other control operations.

Plural items 51-53 may be output via the display of the portable electronic device 1. Hover actions allow one of the items to be pre-selected, for example. Touch actions allow a pre-selection to be confirmed. In the first input mode, i.e. the glove mode, one of the items 51-53 may be pre-selected when the user's finger hovers above the respective item 51-53, and the glove material does not contact the surface 15 of the proximity-sensing user interface 2. In the first input mode, i.e. the glove mode, the pre-selection of one of the items 51-53 may be confirmed when the user's finger covered by glove material is pushed against the surface 15 of the proximity-sensing user interface 2, such that the user's skin is spaced from the surface 15 of the proximity-sensing user interface 2 by less than a threshold value. In the second input mode, i.e. the non-glove mode, one of the items 51-53 may be pre-selected when the user's finger hovers above the respective item 51-53 and the user's skin does not contact the surface 15 of the proximity-sensing user interface 2. In the second input mode, i.e. the non-glove mode, the pre-selection of one of the items 51-53 may be confirmed when the user's skin is pushed against the surface 15 of the proximity-sensing user interface 2.

It will be appreciated that the controller of the portable electronic device 1 may perform different functions in response to the same sensed position, depending on whether the first input mode or the second input mode is activated. For illustration, when the proximity-sensing user interface captures position data indicating that the user's skin is positioned above position 54, and distance data indicating that the user's skin is spaced from the surface 15 of the proximity-sensing user interface 2 by a certain distance, this may still be considered as a touch action when the first input mode is activated. Accordingly, the controller will control operation of the portable electronic device 1 in response to a touch action at position 54. By contrast, when the second input mode is active, the same position information and distance information may be identified to correspond to a hover action. Accordingly, the controller will control operation of the portable electronic device 1 in response to a hover action at position 54.

The threshold(s) involved in identifying touch or hover actions in the first and second input mode(s) may be adjusted based on the lateral position on the proximity-sensing user interface 2. For illustration, different threshold(s) may be used at one position 54 and another position 55 spaced therefrom. The threshold to which sensed distances are compared in the first input mode to identify touch actions may vary as a function of position on the surface 15 of the proximity-sensing user interface 2. Thereby, changes in responsiveness of the proximity-sensing user interface 2 as a function of lateral position may be taken into account.

Figure 13:
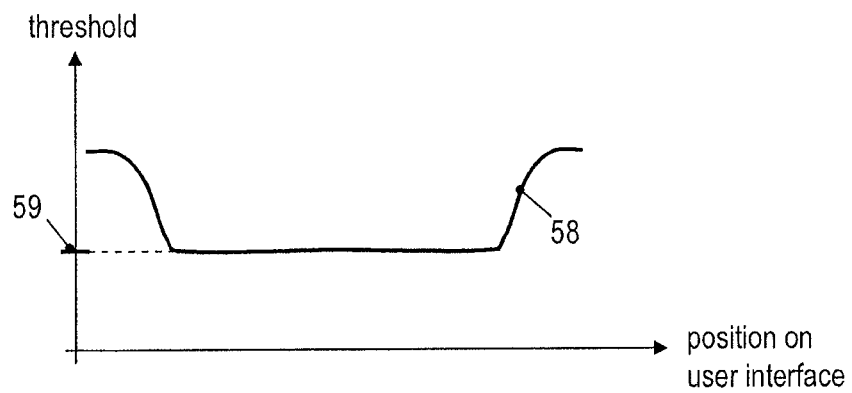
FIG. 13 illustrates a spatially varying threshold used by the portable electronic device of an embodiment.

FIG. 13 is a diagram illustrating a spatially-varying threshold which may be used to identify touch actions while the first input mode is active. FIG. 13 illustrates the threshold as a function of position, taken along a line 50 in FIG. 12. The threshold 58 to which a sensed distance is compared to identify a touch action in the first input mode, i.e. glove mode, varies as a function of position. The threshold 58 may have a minimum value 59. The minimum value 59 may be determined as described with reference to FIGS. 4, 6, 7 and 8. The minimum value 59 of the threshold may be set based on a minimum distance between the user's skin and the surface 15 of the proximity-sensing user interface 2, sensed while a layer of glove material 25 is interposed between the user's skin and the surface 15 of the proximity-sensing user interface 2. The variation of the threshold in dependence on position may be computed using a pre-defined function which is characteristic of the responsiveness of the proximity-sensing user interface 2 as a function of position. For illustration, the threshold 59 may increase towards the boundaries of the proximity-sensing user interface 2. Towards the boundaries, it may be more difficult for the user wearing the glove to closely approach the surface 15 of the proximity-sensing user interface 2, and/or the capacitive proximity sensing may inherently be less sensitive towards the outer boundaries of the proximity-sensing user interface 2. Such effects may be accounted for by allowing the threshold to vary that is used to identify touch actions in the first input mode. In this case, the position information associated with an input action is also taken into account when determining whether an input action is a touch action.

The variations in responsiveness of the proximity-sensing user interface 2 may similarly also be taken into account when determining whether the input mode is to be set to the second input mode and/or when calibrating the first input mode.

Figure 14:
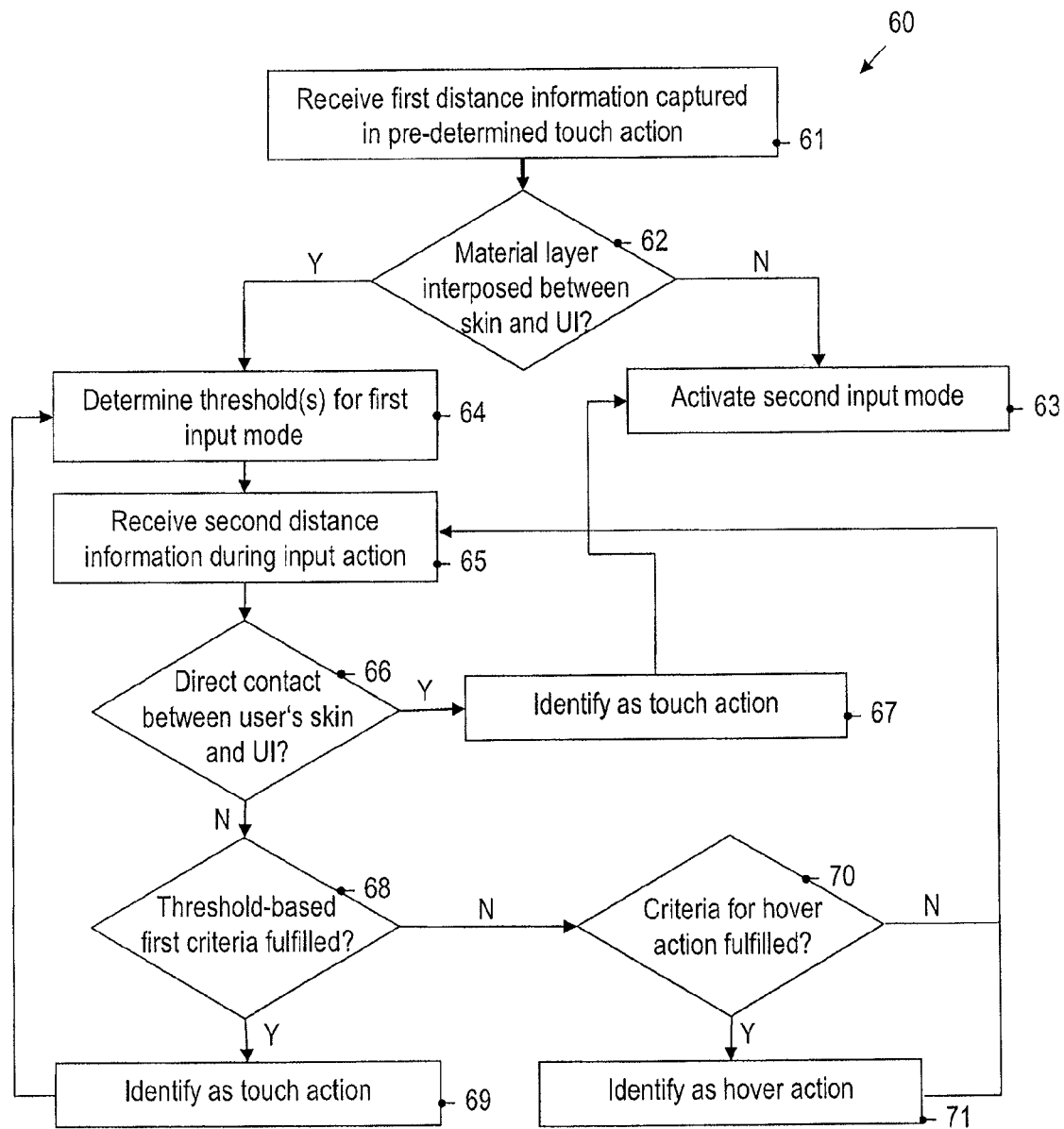
FIG. 14 is a flow diagram of a method of an embodiment.

FIG. 14 is a flow chart of a method of an embodiment. The method is generally indicated at 60. The method may be performed by the portable electronic device as explained with reference to FIGS. 1-13.

At 61, first distance information is received. The first distance information is captured while the user performs a pre-determined touch action in which either a glove material covering the user's skin or the user's skin is brought into contact with a surface of a proximity-sensing user interface. The pre-determined touch action may be an action used to wake up the portable electronic device from an idle state. The pre-determined touch action may be a call-accept action to accept an incoming call. The pre-determined touch action may be a screen unlocking action. In response to the pre-determined touch action, a first input mode which corresponds to a glove mode may be activated as a default mode.

At 62, it is determined whether glove material is interposed between the user's skin and the surface of the proximity-sensing user interface in the pre-determined touch action. The determining at 62 may be performed based on the first distance information received at 61.

If it is determined that no glove material is interposed between the user's skin and the surface of the proximity-sensing user interface, the input mode is set to a second input mode at 63. The second input mode corresponds to a non-glove mode. Operation in the second input mode may be continued until the portable electronic device enters an idle state again. In the second input mode, an input action may be identified to be a touch action depending on whether the user's skin touches the surface of the proximity-sensing user interface.

If it is determined that a glove material is interposed between the user's skin and the surface of the proximity-sensing user interface, the first input mode remains active. The method proceeds to 64.

At 64, operational parameters of the first input mode are determined based on the first distance information received at 61. The operational parameters may include threshold(s) used in the first input mode to identify touch actions based on the captured distance information. If the user performs a swipe movement across the proximity-sensing user interface in the pre-determined touch action, a spatially varying responsiveness of the proximity-sensing user interface may be taken into account when determining the threshold(s).

At 65, second distance information is received. The second distance information is captured while the user performs an input action.

At 66, it is determined whether the user's skin has directly contacted the surface of the proximity-sensing user interface in the input action. This may be the case when the user has in the meantime taken off the glove. The determining at 66 may be performed based on the second distance information received at 65. Alternatively or additionally, other sensor output may be used to determine whether there has been direct contact between the user's skin and the surface of the proximity-sensing user interface. If it is determined that no glove material is interposed between the user's skin and the surface of the proximity-sensing user interface, the method proceeds to 67. At 67, the input action is identified to be a touch action. The method continues at 63, where the second input mode is activated. As previously indicated, the second input mode may remain activated until the portable electronic device enters idle mode again.

If it is determined at 66 that the user's skin did not directly contact the surface of the proximity-sensing user interface, the method proceeds to 68. At 68, it is determined whether the second distance information received at 65 fulfills first criteria. The first criteria may involve the threshold(s) set at 64, to which the second distance information is compared. The input action may be identified as a touch action only if the distance represented by the second distance information is less than a threshold set at 64. Position information indicative of the lateral position at which the input action occurs may be taken into account in the threshold comparison. Additional sensor information may also be utilized, e.g. by verifying that a force acts onto the proximity-sensing user interface in the input action.

If it is determined at 68 that the second distance information fulfills the first criteria, the method proceeds to 69. At 69, the input action is identified as a touch action. The method returns to 64. At 64, the threshold(s) used to identify touch actions in the first input mode may be updated based on the second distance information. The updating may be performed selectively, depending on the distance represented by the second distance information. For illustration, if the second distance information indicates a finite distance between user's skin and the surface of the proximity-sensing user interface, which is less than the minimum of the distances sensed when waking up the portable electronic device or in the preceding input actions, the threshold may be lowered. Alternatively, a floating average of sensed distances may be updated based on the second distance information, to re-determine the threshold(s) taking into account the second distance information captured in the latest input action.

If it is determined at 68 that the second distance information does not fulfill the first criteria, the method proceeds to 70. At 70, it is determined whether the second distance information fulfills hover action criteria used to identify hover actions in the first input mode. As explained with reference to FIG. 8, the hover action criteria may also involve threshold comparisons. If it is determined that the second distance information fulfills the hover action criteria, the input action is identified to be a hover action at 71. The method returns to 65 when the next input action is performed. If it is determined at 70 that the second distance information cannot be identified as a hover action, the input action may be discarded and the method returns to 65 when the next input action is performed.

When the portable electronic device enters idle mode again, any threshold(s) set at 64 may be discarded. The input mode may be set to the first input mode as default mode. After the portable electronic device has entered an active mode, the second input mode corresponding to the non-glove mode may be activated when the user's skin directly contacts the surface of the proximity-sensing user interface.

Additional or alternative steps may be used in the method 60. For illustration, an output signal of a force sensor may be utilized to discriminate touch actions from hover actions in the first and/or second input mode.

The portable electronic devices and the methods of embodiments provide enhanced comfort for the user. The user may control the portable electronic device more easily even when wearing a glove, when a removable protective cover covers the surface of the proximity-sensing user interface, or when the user does not wish to directly contact the surface of the proximity-sensing user interface for other reasons.

While portable electronic devices and methods of operating portable electronic devices have been described with reference to the drawings, modifications and alterations may be implemented in further embodiments. For illustration rather than limitation, while exemplary implementations of a proximity-sensing user interface have been described, other implementations may be used in other embodiments.

For further illustration, while embodiments have been described in which a calibration of the first input mode is performed automatically in response to a touch action which sets the portable electronic device into an active mode, the pre-determined touch action used to calibrate the first input mode may also be a dedicated action. For illustration, a user wearing a glove may be requested to swipe his finger across a portion of the proximity-sensing user interface for calibration of the first input mode. In cases in which the user's skin could directly touch the surface of the proximity-sensing user interface, but the user does not wish to do so, the first input mode may also be activated when the user keeps his finger close to, but spaced from the surface of the proximity-sensing user interface in the pre-determined touch action.

For further illustration, while operation of the portable electronic device has been described in the context of input actions performed using one finger, the devices and techniques described and claimed herein may also be used for multi-finger input.

For further illustration, while embodiments have been described in which both the first input mode and the second mode support touch and hover actions, portable electronic devices of embodiments do not need to support hover actions in both the first and the second input mode. In still other embodiments, only touch actions may be supported.

Examples for portable electronic equipments which may be configured as described herein include, but are not limited to, a mobile phone, a cordless phone, a personal digital assistant (PDA), and the like.

The invention claimed is:

1. A portable electronic device, comprising:
a proximity-sensing user interface configured to capture position information and distance information, the distance information being indicative of a distance at which a user's skin is positioned from a surface of the proximity-sensing user interface; and
a controller coupled to the proximity-sensing user interface, the controller being configured to:
process first distance information captured by the proximity-sensing user interface during a physical touch input, to determine whether a material layer is interposed between the user's skin and the proximity-sensing user interface in the physical touch input,
selectively set an input mode from a first input mode to a second input mode in response to the first distance information indicating that no material layer is interposed between the user's skin and the proximity-sensing user interface in the physical touch input; and
selectively maintain the first input mode active in response to the first distance information indicating that the material layer is interposed between the user's skin and the proximity-sensing user interface.

2. The portable electronic device of claim 1,
the controller being configured to initiate a transition of the portable electronic device to an active state in response to the physical touch input.

3. The method of claim 1, wherein physical touch input includes a direct contact between a user's skin and the proximity-sensing interface.

4. The method of claim 1, wherein physical touch input includes material interposed between a user's skin and the proximity-sensing interface.

5. The portable electronic device of claim 1,
the proximity-sensing user interface comprising a capacitive touch sensor panel overlaid on a display panel.

6. The portable electronic device of claim 5,
the proximity-sensing user interface further comprising a force sensor configured to capture a force applied onto the capacitive touch sensor panel,
the controller being coupled to the force sensor and being configured to control operation of the portable electronic device based on the captured force.

7. The portable electronic device of claim 1,
the controller being configured to identify, while the first input mode is active, an input action in which the user's skin remains spaced from the proximity-sensing user interface as a touch action when second distance information captured during the input action fulfills first criteria, the controller being configured to calibrate the first criteria based on the first distance information.

8. The portable electronic device of claim 7, wherein the first criteria comprise a comparison to a threshold, the controller being configured to set the threshold based on the first distance information.

9. The portable electronic device of claim 8, wherein the controller is configured to set the threshold based on a minimum distance between the user's skin and the surface of the proximity-sensing user interface during the physical touch input.

10. The portable electronic device of claim 8, wherein the controller is configured to set the threshold based on the first distance information and based on first position information captured by the proximity-sensing user interface during the physical touch input.

11. The portable electronic device of claim 8, wherein the controller is configured to perform the comparison to the threshold as a function of second position information captured by the proximity-sensing user interface during the input action, the second position information indicating a position of the input action on the surface of the proximity-sensing user interface.

12. The portable electronic device of claim 8, wherein the controller is configured to adjust the threshold based on the second distance information.

13. The portable electronic device of claim 7, wherein the controller is configured to selectively set the input mode from the first input mode to the second input mode when the second distance information indicates that the user's skin is in direct contact with the surface of the proximity-sensing user interface.

14. The portable electronic device of claim 7, the controller being configured to identify, while the second input mode is active, the input action as a touch action when the second distance information captured during the input action fulfills second criteria, the second criteria being different from the first criteria.

15. A portable electronic device, comprising:

a proximity-sensing user interface configured to capture position information and distance information, the distance information being indicative of a distance at which a user's skin is positioned from a surface of the proximity-sensing user interface; and a controller coupled to the proximity-sensing user interface, the controller being configured to:

process first distance information captured by the proximity-sensing user interface during a physical touch input, to determine whether a material layer is interposed between the user's skin and the proximity-sensing user interface in the physical touch input;

set a threshold based on an averaged distance between the user's skin and the surface of the proximity-sensing user interface during the physical touch input; and identify a subsequent input action in which the user's skin remains spaced by a gap from the proximity-sensing user interface as a touch action when the gap is less than or equal to the threshold which depends on the averaged distance.

16. The method of claim 15, wherein physical touch input includes a direct contact between a user's skin and the proximity-sensing interface.

17. The method of claim 15, wherein physical touch input includes material interposed between a user's skin and the proximity-sensing interface.

18. A method of controlling a portable electronic device, the portable electronic device having a proximity-sensing user interface, the method comprising:

capturing, by the proximity-sensing user interface, first distance information indicative of a distance at which a user's skin is positioned from a surface of the proximity-sensing user interface during a physical touch input;

processing the first distance information to determine whether a material layer is interposed between the user's skin and the proximity-sensing user interface in the physical touch input;

selectively setting an input mode from a first input mode to a second input mode in response to the first distance information indicating that no material layer is interposed between the user's skin and the proximity-sensing user interface in the physical touch input; and selectively maintaining the first input mode active in response to the first distance information indicating that the material layer is interposed between the user's skin and the proximity-sensing user interface.

19. The method of claim 18, further comprising:

setting a threshold based on an averaged distance between the user's skin and the surface of the proximity-sensing user interface during the pre-physical touch input; and identify, while the first input mode is active, a subsequent input action in which the user's skin remains spaced by a gap from the proximity-sensing user interface as a touch action when the gap is less than or equal to the threshold which depends on the averaged distance.

20. The method of claim 18, wherein physical touch input includes a direct contact between a user's skin and the proximity-sensing interface.

21. The method of claim 18, wherein physical touch input includes material interposed between a user's skin and the proximity-sensing interface.

* * * * *